US008204208B2

(12) United States Patent
Goldman et al.

(10) Patent No.: US 8,204,208 B2
(45) Date of Patent: Jun. 19, 2012

(54) PRIORITY TELEPHONE SERVICE REVERSION AND NOTIFICATION

(75) Inventors: Stuart O. Goldman, Scottsdale, AZ (US); Richard E. Krock, Naperville, IL (US); Karl F. Rauscher, Emmaus, PA (US); James P. Runyon, Wheaton, IL (US)

(73) Assignee: Alcatel Lucent, Paris (FR)

( * ) Notice: Subject to any disclaimer, the term of this patent is extended or adjusted under 35 U.S.C. 154(b) by 1154 days.

(21) Appl. No.: 11/626,350

(22) Filed: Jan. 23, 2007

(65) Prior Publication Data

US 2008/0192921 A1 Aug. 14, 2008

(51) Int. Cl.
*H04M 3/00* (2006.01)

(52) U.S. Cl. .................. 379/342; 379/208.01; 379/139; 379/207.13; 379/373.02

(58) Field of Classification Search .................. 379/207, 379/229, 207.13, 373.02, 67, 88, 89
See application file for complete search history.

(56) References Cited

U.S. PATENT DOCUMENTS

| 5,329,578 | A | * | 7/1994 | Brennan et al. | 379/211.03 |
|---|---|---|---|---|---|
| 5,825,856 | A | | 10/1998 | Porter et al. | |
| 6,175,621 | B1 | * | 1/2001 | Begeja | 379/208.01 |
| 6,665,534 | B1 | * | 12/2003 | Conklin et al. | 455/417 |
| 2003/0235286 | A1 | * | 12/2003 | Goldman | 379/243 |
| 2005/0243988 | A1 | | 11/2005 | Barclay et al. | |
| 2007/0121852 | A1 | * | 5/2007 | Taylor et al. | 379/139 |

FOREIGN PATENT DOCUMENTS

EP   0 837 611 A   4/1998

* cited by examiner

*Primary Examiner* — Joseph J Nguyen
(74) *Attorney, Agent, or Firm* — Fay Sharpe LLP

(57) ABSTRACT

A method of administering a priority service is provided in a telecommunications network (20). The priority service provides higher priority handling of calls employing the service as compared to calls not employing the service for purposes of call completion. The method includes: obtaining at least one authentication credential from a user placing a call over the network (20); verifying a validity of the obtained credential; designating the call for priority handling if the credential is valid, otherwise designating the call for non-priority handling if the credential is invalid; and, attempting to complete the call over the network (20) in accordance with the designated handling.

18 Claims, 1 Drawing Sheet

PRIORITY TELEPHONE SERVICE REVERSION AND NOTIFICATION

FIELD

The present inventive subject matter relates to the telecommunication arts. Particular application is found in conjunction with certain types of premium services and telecommunication networks, and the specification makes particular reference thereto. However, it is to be appreciated that aspects of the present inventive subject matter are also amenable to other like applications and/or networks.

BACKGROUND

In general, it is known to provision telecommunication networks with priority services. For example, the Government Emergency Telecommunication Service (GETS) is employed in the Public Switched Telephone Network (PSTN) to provide priority service to NS/EP (National Security/Emergency Preparedness) personnel. Similarly, WPS (Wireless Priority Service) is employed in cellular or mobile telecommunication networks. Generally, the goal of priority service is to provide a higher probability and/or rate of call completion for selected calls. As is understood in the art, GETS and/or WPS calls receive priority handling as compared to ordinary calls (i.e., non-priority calls).

As can be appreciated, in times of emergency or crisis or otherwise, telecommunication networks can become congested by an unusually heavy call volume. Moreover, natural or other catastrophes may impair or damage network facilities thereby reducing the networks capacity to handle the increased call volume. The unusually high call volume and/or reduced network capacity tends to increase network congestion and limit the network's ability to complete ordinary calls. Services like GETS and WPS and other similar priority services supported by telecommunication networks are employed by users to obtain higher priority for completing calls utilizing these services as compared to ordinary calls.

In order to receive access to a priority service, a user generally subscribes to the particular service or otherwise registers to use the service. To use the service in connection with a particular call, the subscriber typically enters or otherwise submits a password, a user name or number or other ID and/or other authentication credentials at or near the time the call is placed. The submitted credentials are used by the network to verify that the user is in fact a subscriber to the priority service or is otherwise entitled to use the priority service. Provided the supplied credentials are valid, the call associated with the invoked priority service is given priority by the network over ordinary calls, e.g., for purposes of call completion. On the other hand, in one proposed approach, if the credentials are not valid, then the call is denied altogether. That is to say, no attempt is made within the network to complete the call. In this manner, an otherwise authorized user that erroneously enters their credentials or attempts to use expired credentials, e.g., to make a test call utilizing the priority service at a time when the network is operating normally or not congested, is made aware by the call failure that the submitted credentials are invalid. Accordingly, the problem can be addressed (e.g., the credentials can be renewed) before an actual crisis occurs in which the user would like to take advantage of the priority service. In this way, a user is not faced with the additional problem of having or using invalid credentials at the time of the crisis.

While generally acceptable, the foregoing approach has certain limitations. For example, a user accidentally entering or otherwise submitting invalid credentials may still desire that the network attempt to complete the call even though the attempt to invoke the priority service may have failed. However, if the call is in fact completed (e.g., because the network is not overly congested or otherwise has sufficient capacity to complete the call without priority handling), then the user may get the mistaken impression that their credentials are valid and/or were entered correctly. Such a wrong impression can present a problem the next time the user attempts to invoke the priority service and continues to mistakenly enter and/or use the invalid credentials, particularly if the network is now too congested to complete the call unless it receives priority handling.

Accordingly, a new and improved system and/or method for administering priority services in a telecommunications network is disclosed that overcomes the above-referenced problems and others.

SUMMARY

In accordance with one embodiment, a method of administering a priority service is provided in a telecommunications network. The priority service provides higher priority handling of calls employing the service as compared to calls not employing the service for purposes of call completion. The method includes: obtaining at least one authentication credential from a user placing a call over the network; verifying a validity of the obtained credential; designating the call for priority handling if the credential is valid, otherwise designating the call for non-priority handling if the credential is invalid; and, attempting to complete the call over the network in accordance with the designated handling.

In accordance with another embodiment, a system for administering a priority service in a telecommunications network is provided. The priority service provides higher priority handling of calls employing the service as compared to calls not employing the service for purposes of call completion. The system includes: means for obtaining at least one authentication credential from a user placing a call over the network; means for verifying a validity of the obtained credential; priority designation means for designating the call for priority handling if the credential is valid, otherwise said priority designation means designating the call for non-priority handling if the credential is invalid; and, means for attempting to complete the call over the network in accordance with the handling designated by the priority designation means.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION OF PREFERRED EMBODIMENTS

For clarity and simplicity, the present specification shall refer to structural and/or functional elements, entities and/or facilities, relevant communication standards, protocols and/or services, and other components that are commonly known in the telecommunications and/or networking arts without further detailed explanation as to their configuration or operation except to the extent they have been modified or altered in accordance with and/or to accommodate the preferred embodiment(s) presented herein.

Figure 1:
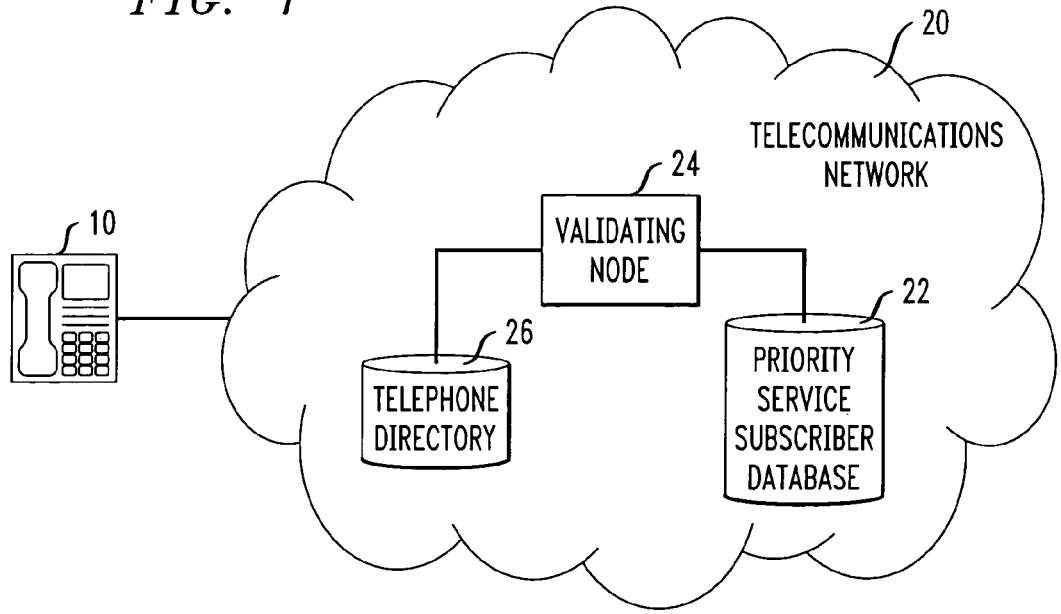
FIG. 1 is a diagram illustrating an exemplary telecommunications network suitable for practicing aspects of the present inventive subject matter.

With reference to FIG. 1, there is shown an end user terminal (EUT) 10 that is operatively connected to a telecommunications network 20 in the usual manner. For example, the EUT 10 is optionally a telephone or other telecommunications device that a user employs to selectively place calls and/or receive calls over the network 20. For the purposes of simplicity and/or clarity herein, only a single EUT 10 has been illustrated. However, it is to be appreciated that in practice, typically, a plurality of similar EUTs are likewise arranged and/or served by the network 20.

Suitably, the network 20 is a PSTN or a cellular or wireless network or some combination thereof or some other like network. In a suitable embodiment, the network 20 is provisioned with and/or otherwise supports a priority service, such as GETS or WPS or some other similar priority service. Normally, when the priority service is successfully invoked in connection with a particular call, the associated call is afforded priority handling by the network 20 as compared to ordinary (i.e., non-priority) calls. That is to say, as compared to ordinary calls placed over the network 20, the network 20 assigns or otherwise provides a higher priority to priority calls, e.g., for purposes of call completion.

In order to obtain access to the priority service, a user subscribes to the service or otherwise registers to use the service. Subscription or registration information for the user is stored and/or maintained in a suitable location accessible by the network 20, e.g., such as a priority service subscription database (DB) 22. Suitably, the subscription information maintained in the DB 22 includes one or more of the following: the user's name (e.g., John Doe), an address associated with the user (e.g., a mailing or billing address), one or more telephone numbers associated with the user (e.g., the telephone number assigned to the EUT 10) and authentication credentials established for the user. Suitably, the authentication credentials include a user name or number or other user ID and optionally a password.

To activate or invoke the priority service in connection with a particular call placed via the EUT 10, the calling party (i.e., the user or subscriber) supplies the network 20 with their authentication credentials at or near the time the call is placed. For example, when placing the priority call, the user optionally employs the EUT 10 to enter their credentials. The submitted credentials are used by the network 20 to verify that the calling party or user is in fact a subscriber to the priority service or is otherwise entitled to use the priority service. Suitably, the foregoing verification is performed by a validating node (VN) 24 of the network 20. More specifically, the VN 24 receives or otherwise obtains the credentials supplied by the user and compares the supplied credentials to the credentials maintained in the DB 22 to determine if the supplied credentials are valid.

Figure 2:
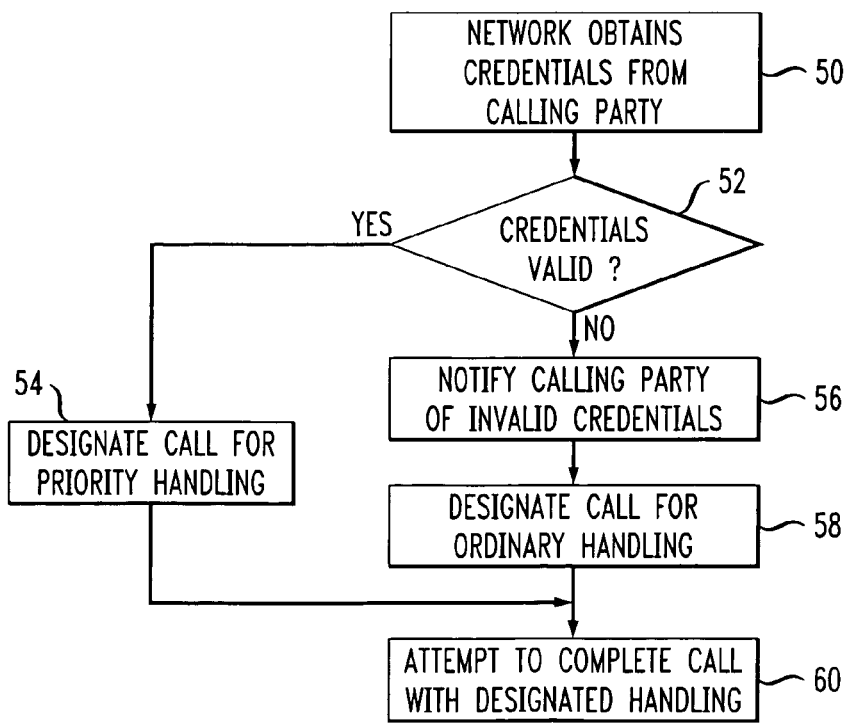
FIG. 2 is a flow chart illustrating an exemplary process suitable for practicing aspects of the present inventive subject matter.

With reference to FIG. 2, an exemplary process is shown for administering the priority service on the network 20. For purposes of this example, it shall be assumed that a calling party (i.e., the user) is attempting to place a priority call over the network 20 with the EUT 10.

At step 50, the network 20 obtains the authentication credentials from the calling party. Suitably, while placing the call, the user enters the credentials via the EUT 10. For example, at or near the time the call is being placed or in response to an appropriate prompt from the network 20, the user may employ the EUT 10 to optionally dial or otherwise enter their user ID and/or any other credentials. In this manner, the network 20 obtains the supplied credentials.

At decision step 52, it is determined is the credentials obtained in step 50 are valid. Optionally, this validation is performed by the VN 24 which compares the obtained credentials to the credentials maintained in the DB 22 to determine if the obtained credentials are valid. Suitably, if the obtained credentials sufficiently match a set of credentials within the DB 22, then the obtained credentials are deemed valid, otherwise, they are deemed invalid.

If the determination made at step 52 is that the obtained credentials are valid, then the process branches to step 54 and the call is designated for priority handling. Thereafter, at step 60, the network 20 attempts to complete the call in accordance with the designated handling, which in this case is priority handling. Alternately, if the determination made at step 52 is that the obtained credentials are not valid, then the process continues to step 56. Optionally, however, the user may first be provided one or more opportunities to resubmit or reenter alternate credentials, at which point the process returns to the decision step 52.

At step 56, the calling party or user is notified that invalid credentials had been supplied, and at step 58, the call is designated for ordinary (i.e., non-priority) handling. Thereafter, at step 60, the network 20 still attempts to complete the call in accordance with the designated handling. However, in this case, ordinary or non-priority handling has been designated for the call. Accordingly, even though the attempt to invoke the priority service has failed, the network 20 still attempts to complete the call, albeit with ordinary handling. Moreover, even assuming that the call is actually completed, due to the notification provided in step 56, the user is not given the mistaken impression that the supplied credentials were in fact valid.

With regard to providing the calling party the aforementioned notification in step 56, any one or more suitable options may be employed. For example, during the setup of the attempted priority call, the VN 24 or network 20 may optionally cause an announcement to be played or message sent to the EUT 10 indicating that the supplied credentials were invalid. The announcement or message may also indicate that the call is still being attempted, albeit with ordinary handling, and optionally, that the call will be billed as usual for non-priority service for the calling EUT 10. Optionally of course, calls designated for ordinary handling in accordance with the process illustrated in FIG. 2 are in fact tracked and billed as usual for non-priority service for the EUT 10 from which the call was placed.

In another example, the notification provided in step 56 is optionally sent to the user in one or more separate communications, i.e., communications separate from the attempted priority call. The separate communications may optionally be delivered via a suitable postal service, e-mail or in a separate call. For example, the user attempting to place the priority call is first identified and then the separate communication including the notification is sent thereto via one or more selected delivery methods.

For example, the authentication credentials supplied to the network 20 when attempting the priority call from the EUT 10 may include a user ID which matches a user ID maintained in the DB 22. However, the credentials may still be deemed invalid, e.g., because an incorrect password was used or because they were expired or otherwise. Accordingly, the network 20 or VN 24 identifies the user associated with the matching user ID in the DB 22 as the individual attempting to make the priority call. The appropriate notification (i.e., indicating the attempted use of invalid credentials) is then sent to the identified user, e.g., via a letter or other correspondence mailed to the address associated with the user in the DB 22, or via an automated or other call placed to one or more of the telephone numbers associated with the user in the DB 22, or via an e-mail sent to the user, or via some other suitable delivery method.

At times, a user attempting to make the priority call may not be identifiable from the credentials provided. For example, the user may mistakenly enter or otherwise supply an erroneous user ID or other erroneous credentials that fail to match any entry in the DB 22. In such instances, the network 20 or VN 24 optionally obtains the telephone or directory number (DN) of the EUT 10 from which the priority call was attempted, e.g., using ANI (Automatic Number Identification) or some other like function or service. The obtained DN is then optionally cross-referenced against the DB 22 to identify an associated user listed therein. Still, however, the DN obtained may not be associated with an entry in the DB 22. For example, the user may be attempting to place the priority call from an EUT having a DN that is not included with their subscription information in the DB 22. Accordingly, the obtained DN is then optionally used to conduct a reverse directory look-up, e.g., in a public or other telephone directory 26, to obtain a name or address associated with the DN in the directory 26. The obtained name or address is then optionally cross-referenced against the DB 22 to identify an associated user listed therein.

Notwithstanding the flow of exemplary process illustrated in FIG. 2, optionally, attempted priority calls are initially afforded priority status. However, upon a failure of the authentication credentials to be validated by the VN 24, the call is lowered to ordinary (i.e., non-priority) status. Optionally, this status change is implemented for both SS7 (Signaling System 7) based calls and/or IP (Internet Protocol) based calls. For example, the status change is optionally achieved for SS7 based calls by resetting the SS7 Initial Address Message (IAM) Calling Party's Category (CPC) from NS/EP to ordinary and by removing the Session Initiation Protocol (SIP) Resource Priority Header (RPH) element for IP based calls.

While the foregoing specifically refers to priority services, the concepts and/or methods that are described herein are equally applicable to a range of premium telephone services where it is deemed advisable or desirable to default to ordinary call handling as opposed to completely blocking or denying calls attempting to invoke or utilize those services. Moreover, it is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method of administering a priority service in a telecommunications network, said priority service providing higher priority handling of calls employing the service as compared to calls not employing the service for purposes of call completion, said method comprising:
    (a) obtaining an authentication credential from a user attempting to place a priority call over a telecommunications network via a priority service and, at least initially, affording the attempted priority call with priority status;
    (b) verifying the user is entitled to use the priority service by determining if the obtained authentication credential is valid;
    (c) in response to determining the obtained authentication credential is invalid, notifying the user that the authentication credential provided in conjunction with the attempted priority call is invalid;
    (d) changing the priority status for the attempted priority call to ordinary status and designating the attempted priority call for non-priority handling after determining the obtained authentication credential is invalid; and,
    (e) attempting to complete the attempted priority call over the telecommunications network in accordance with the non-priority handling after determining the obtained authentication credential is invalid;
    wherein the telecommunications network uses priority handling to provide a higher probability of completion for valid priority calls as compared to non-priority handling for invalid priority calls and ordinary calls;
    wherein said notifying in (c) comprises at least one of playing an announcement or sending a message to the user during a setup of the call which indicates that the obtained credential is invalid;
    wherein said notifying in (c) also indicates to the user that the call is being attempted in accordance with non-priority handling.

2. The method of claim 1 wherein said notifying in (c) comprises:
    identifying the user; and,
    sending a separate communication to the user.

3. The method of claim 2, wherein the user is identified from at least a portion of the invalid authentication credential.

4. The method of claim 2, wherein the separate communication is mail sent to the user via a postal service.

5. The method of claim 2 wherein the separate communication includes an e-mail message sent to the user.

6. The method of claim 2 wherein the separate communication includes a separate call to the user.

7. The method of claim 1, further comprising:
maintaining a database of registered users that are permitted to access the priority service, said database associating registered users with corresponding authentication credentials.

8. The method of claim 7, wherein the verifying in (b) comprises:
comparing the obtained authentication credential to the corresponding authentication credential maintained in the database for the user attempting to place the priority call, said obtained credential being valid if it matches one maintained in the database, otherwise said obtained credential being invalid if it does not match one maintained in said database.

9. The method of claim 1, further comprising:
providing the user with an opportunity to submit an alternate authentication credential for the attempted priority call after determining the obtained authentication credential is invalid.

10. A system for administering a priority service in a telecommunications network, said priority service providing higher priority handling of calls employing the service as compared to calls not employing the service for purposes of call completion, said system comprising:
means for obtaining an authentication credential from a user attempting to place a priority call over a telecommunications network via a priority service;
means for verifying the user is entitled to use the priority service by determining if the obtained authentication credential is valid;
notifying means for notifying the user, in response to the means for verifying determining the obtained authentication credential is invalid, that the authentication credential provided in conjunction with the attempted priority call is invalid;
priority designation means for, at least initially, affording the attempted priority call with priority status and for changing the priority status for the attempted call priority call to ordinary status and designating the attempted priority call for non-priority handling after the means for verifying determines the obtained authentication credential is invalid; and,
means for attempting to complete the attempted priority call over the telecommunications network in accordance with the non-priority handling designated by the priority designation means;
wherein the telecommunications network uses priority handling to provide a higher probability of completion for valid priority calls as compared to non-priority handling for invalid priority calls and ordinary calls;
wherein said notifying provided by the notifying means comprises at least one of playing an announcement or sending a message to the user during a setup of the call that indicates the obtained credential is invalid;
wherein said notifying provided by the notifying means also indicates to the user that the call is being attempted in accordance with non-priority handling.

11. The system of claim 10, wherein said notifying means provides at least one of an announcement played or a message sent to the user during a setup of the call.

12. The method of claim 10, wherein said notifying provided by the notifying means comprises identifying the user, and sending a separate communication to the user indicating that the obtained authentication credential is invalid.

13. The system of claim 10, wherein said telecommunications network includes at least one of a public switched telephone network and a wireless network.

14. The system of claim 10 wherein the notifying means identifies the user from at least a portion of the invalid authentication credential in conjunction with notifying the user.

15. A method of administering a priority service in a telecommunications network, comprising:
a) receiving an authentication credential from an end user terminal in conjunction with a calling party attempting to place a priority call from the end user terminal to a called party using a priority service associated with a telecommunications network and, at least initially, affording the attempted priority call with priority status;
b) verifying the calling party is entitled to use the priority service by determining if the received authentication credential is valid; and
c) in response to determining the obtained authentication credential is invalid, notifying the calling party that the authentication credential provided in conjunction with the attempted priority call is invalid and changing the priority status for the attempted priority call to ordinary status;
wherein the telecommunications network uses priority handling to provide a higher probability of completion for valid priority calls as compared to non-priority handling for invalid priority calls and ordinary calls;
wherein the notifying in c) includes at least one of playing an announcement or sending a message to the calling party during a setup of the call that indicates the obtained credential is invalid;
wherein the notifying in c) also indicates to the calling party that the call is being handled in accordance with non-priority handling.

16. The method of claim 15, further comprising:
d) attempting to complete the attempted priority call to the called party using non-priority handling after determining the received authentication credential is invalid.

17. The method of claim 15, further comprising:
d) providing the calling party with an opportunity to submit an alternate authentication credential for the attempted priority call after determining the received authentication credential is invalid.

18. The method of claim 15 wherein the notifying in c) comprises:
identifying the user from at least a portion of the invalid authentication credential.

* * * * *